(12) United States Patent
Ko et al.

(10) Patent No.: US 10,074,884 B2
(45) Date of Patent: Sep. 11, 2018

(54) METAL AIR BATTERY HAVING AIR PURIFICATION MODULE AND METHOD OF OPERATING THE METAL AIR BATTERY

(71) Applicant: Samsung Electronics Co., Ltd., Suwon-si, Gyeonggi-do (KR)

(72) Inventors: Jeongsik Ko, Seongnam-si (KR); Hyukjae Kwon, Suwon-si (KR); Dongmin Im, Seoul (KR)

(73) Assignee: SAMSUNG ELECTRONICS CO., LTD., Gyeonggi-Do, Korea (*) Notice: Subject to any disclaimer, the term of this patent is extended or adjusted under 35 U.S.C. 154(b) by 137 days.

(21) Appl. No.: 15/132,720

(22) Filed: Apr. 19, 2016

(65) Prior Publication Data
US 2016/0344080 A1 Nov. 24, 2016

(30) Foreign Application Priority Data

May 19, 2015 (KR) .................. 10-2015-0069793
Mar. 23, 2016 (KR) .................. 10-2016-0034672

(51) Int. Cl.
*H01M 12/02* (2006.01)
*H01M 12/08* (2006.01)
(Continued)

(52) U.S. Cl.
CPC ......... *H01M 12/08* (2013.01); *H01M 8/0444* (2013.01); *H01M 8/04492* (2013.01);
(Continued)

(58) Field of Classification Search
CPC .................. H01M 12/08; H01M 12/02
(Continued)

(56) References Cited

U.S. PATENT DOCUMENTS 5,595,949 A * 1/1997 Goldstein .............. B01D 53/62
423/220
9,362,581 B2 * 6/2016 Noda .................. H01M 8/0668
(Continued)

FOREIGN PATENT DOCUMENTS

JP 2007-278393 A 4/2006
JP 2007087393 A 11/2007
(Continued)

*Primary Examiner* — Samuel Berhanu
*Assistant Examiner* — Tessema Kebede
(74) *Attorney, Agent, or Firm* — Cantor Colburn LLP

(57) ABSTRACT

A metal air battery having an air purification module and a method of operating the metal air battery, the metal air battery including: a battery cell module configured to generate electricity using oxidation of a metal and reduction of oxygen; an air purification module including a first adsorption unit and being configured to supply air purified by the first adsorption unit to the battery cell module, the first adsorption unit being configured to adsorb an impurity; and a detection module configured to detect a concentration of the impurity, wherein the air purification module further includes a recycling unit configured to desorbs the impurity adsorbed into the first adsorption unit; and a controller configured to control an operation of the recycling unit based on the concentration of the impurity detected by the detection module.

20 Claims, 10 Drawing Sheets

(51) Int. Cl.
*H01M 8/0662* (2016.01)
*H01M 8/0444* (2016.01)
*H01M 8/04492* (2016.01)
*H01M 4/38* (2006.01)

(52) U.S. Cl.
CPC .......... *H01M 8/0662* (2013.01); *H01M 4/382* (2013.01); *Y02E 60/128* (2013.01)

(58) Field of Classification Search
USPC .................................................. 429/402–407
See application file for complete search history.

(56) References Cited

U.S. PATENT DOCUMENTS

| | | | | |
|---|---|---|---|---|
| 2005/0022670 | A1* | 2/2005 | Dallas | B01D 53/0415 96/108 |
| 2009/0253021 | A1* | 10/2009 | Baika | H01M 8/04089 429/423 |
| 2010/0151336 | A1* | 6/2010 | Nakanishi | H01M 6/14 429/407 |
| 2013/0106359 | A1 | 5/2013 | Noda et al. | |
| 2014/0045080 | A1* | 2/2014 | Albertus | H01M 12/08 429/405 |
| 2014/0318106 | A1* | 10/2014 | Mizuno | H01M 8/04201 60/301 |

FOREIGN PATENT DOCUMENTS

| | | |
|---|---|---|
| KR | 100464624 B1 | 12/2004 |
| WO | 8402283 | 6/1984 |

\* cited by examiner

METAL AIR BATTERY HAVING AIR PURIFICATION MODULE AND METHOD OF OPERATING THE METAL AIR BATTERY

CROSS-REFERENCE TO RELATED APPLICATION

This application claims priority to and the benefit of Korean Patent Application No. 10-2015-0069793, filed on May 19, 2015, and Korean Patent Application No. 10-2016-0034672, filed on Mar. 23, 2016, both of which were filed in the Korean Intellectual Property Office, and all the benefits accruing therefrom under 35 U.S.C. § 119, the contents of both of which are incorporated herein in their entirety by reference.

BACKGROUND

1. Field

The present disclosure relates to metal air batteries, electrochemical cells and methods of operating the metal air batteries, and more particularly, to a metal air battery having an air purification module, an electrochemical cell having an air purification module and a method of operating the metal air battery.

2. Description of the Related Art

Electrochemical cells, for example metal air batteries include a plurality of metal air battery cells. Each of the plurality of metal air battery cells includes a cathode that may absorb and discharge ions and an anode in which oxygen in air is used as an active material. Reduction and oxidation reactions of oxygen introduced from the outside occur in the anode, and oxidation and reduction reactions of a metal occur in the cathode. Chemical energy generated is thus converted into electrical energy, which is extracted to do work. For example, the metal air batteries absorb oxygen during discharge and discharge oxygen during charge. In this way, the metal air batteries use oxygen present in the air so that an energy density of the metal air batteries can be desirable. For example, the metal air battery may have an energy density that is equal to or several times greater than an energy density of a lithium ion battery.

In addition, the metal air batteries have a low ignition possibility caused by abnormal high temperature and thus have an excellent stability. The metal air batteries can operate only through absorption and discharging of oxygen without the need of using heavy metals and thus have less possibility of causing environmental contamination. Due to their various advantages, much research into metal air batteries has been performed. Nonetheless, an improved metal air battery is needed.

SUMMARY

Provided are a metal air battery and an electrochemical cell having an air purification module.

Provided is a method of operating the metal air battery.

Additional aspects will be set forth in part in the description which follows and, in part, will be apparent from the description, or may be learned by practice of the presented exemplary embodiments.

According to an aspect, a metal air battery includes: a battery cell module configured to generate electricity based on oxidation of a metal and reduction of oxygen; an air purification module including a first adsorption unit and being configured to supply air purified by the first adsorption unit to the battery cell module, the first adsorption unit being configured to adsorb an impurity; and a detection module configured to detect a concentration of the impurity, wherein the air purification module includes: a recycling unit configured to desorb the impurity adsorbed into the first adsorption unit; and a controller configured to control an operation of the recycling unit based on the concentration of the impurity detected by the detection module.

The impurity may include water ($H_2O$).

The controller may operate the recycling unit when charging of the battery cell module is performed, by comparing a concentration of water detected by the detection module with a first reference concentration.

The controller may operate the recycling unit when discharging of the battery cell module is performed, by comparing a concentration of water detected by the detection module with a second reference concentration that is greater than the first reference concentration.

The adsorption unit may include a plurality of adsorption chambers disposed in parallel, and when discharging of the battery cell module is performed, a first adsorption chamber of the plurality of adsorption chambers may adsorb water and may supply purified air to the battery cell module, and a second adsorption chamber of the plurality of adsorption chambers may desorb water using the recycling unit and discharge water to the outside.

The recycling unit may be configured to heat the adsorption unit.

The air purification module may further include a second adsorption unit that is disposed in series with the adsorption unit that purifies air that passes through the adsorption unit, and which supplies the purified air to the battery cell module.

The air purification module may further include an auxiliary adsorption unit that is disposed in parallel to the adsorption unit and has a smaller adsorption capacity than that of the adsorption unit.

The detection module may be disposed in at least one position of an upstream position and a downstream position of the air purification module.

The adsorption unit may be configured to be operated by at least one method selected from pressure swing adsorption ("PSA"), temperature swing adsorption ("TSA"), pressure temperature swing adsorption ("PTSA"), and vacuum swing adsorption ("VSA").

The metal of the battery cell module may be lithium (Li).

According to an aspect, a method of operating the metal air battery includes: operating the battery cell module by charging or discharging the battery cell module; detecting a concentration of an impurity included in air purified by the first adsorption unit; and desorbing and recycling the impurity adsorbed into the first adsorption unit with the recycling unit, based on the detected concentration of the impurity detected by the detection module in the air purified by the first adsorption unit, to operate the metal air battery.

The impurity may include water.

The recycling unit may be operated when charging of the battery cell module is performed, by comparing a concentration of water detected by the detection module with a first reference concentration.

The recycling unit may be operated when discharging of the battery cell module is performed, by comparing a concentration of water detected by the detection module with a second reference concentration that is greater than the first reference concentration.

The adsorption unit may include a plurality of adsorption chambers disposed in parallel, and when discharging of the battery cell module is performed, a first adsorption chamber of the plurality of adsorption chambers may adsorb water and may supply purified air to the battery cell module, and a second adsorption chamber of the plurality of adsorption chambers may desorb water using the recycling unit and may discharge water to the outside.

The recycling may include heating the adsorption unit to desorb water which is adsorbed into the adsorption unit.

According to an aspect, an electrochemical cell includes: a battery cell module configured to generate electricity using a chemical reaction; an air purification module including an adsorption unit and being configured to supply air purified by the adsorption unit to the battery cell module, the adsorption unit configured to adsorb an impurity; and a detection module configured to detect concentration of the impurity, wherein the air purification module further includes: a recycling unit configured to desorb the impurity adsorbed into the adsorption unit; and a controller configured to control an operation of the recycling unit based on the concentration of the impurity detected by the detection module.

The impurity may include water.

The controller may be further configured to operate the recycling unit when charging of the battery cell module is performed, by comparing a concentration of water detected by the detection module with a first reference concentration and to operate the recycling unit when discharging of the battery cell module is performed, by comparing the concentration of water detected by the detection module with a second reference concentration which is greater than the first reference concentration.

Also disclosed is a method of operating a metal air battery, the method including: purifying air with an air purification module of the metal air battery to provide purified air; detecting a concentration of water in the purified air with a detection module of the metal air battery; comparing the concentration of water in the purified air to a reference concentration; saving an instruction to operate a recycling unit of the metal air battery, which recycles an adsorption unit of the air purification module when the concentration of water in the purified air is greater than a reference concentration; and supplying the purified air to the battery cell to operate the metal air battery.

Also disclosed is a method of operating a metal air battery, the method including: detecting a concentration of water in air provided to an air purification module; purifying air with the air purification module to provide purified air; determining a content of water accumulated in the air purification module; comparing the content of water accumulated in the air purification module to a reference content; saving an instruction to operate a recycling unit, which recycles an adsorption unit of the air purification module when the content of water accumulated in the air purification module is greater than a reference content; and supplying the purified air to the metal air battery to operate the metal air battery.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
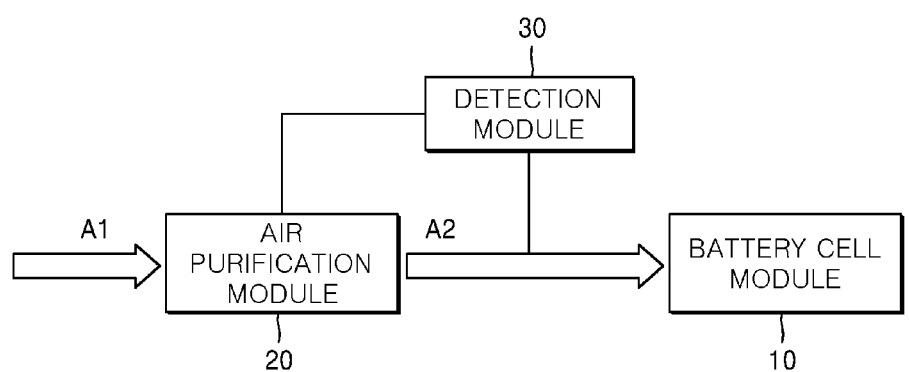
FIG. 1 is a schematic view of an embodiment of an electrochemical cell.

Reference will now be made in detail to exemplary embodiments, examples of which are illustrated in the accompanying drawings, wherein like reference numerals refer to like elements throughout. The size or thickness of each element may be exaggerated for convenience of explanation. In this regard, the present exemplary embodiments may have different forms and should not be construed as being limited to the descriptions set forth herein. Accordingly, the exemplary embodiments are merely described below, by referring to the figures, to explain aspects.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

When a metal air battery is operated, air is supplied to the anode, and oxygen molecules are used as an active material. In this case, impurities, such as water ($H_2O$) included in the air, disturb generation of peroxides, for example, lithium peroxide ($Li_2O_2$), so that the capacity and lifetime of the metal air battery can be reduced.

Figure 2:
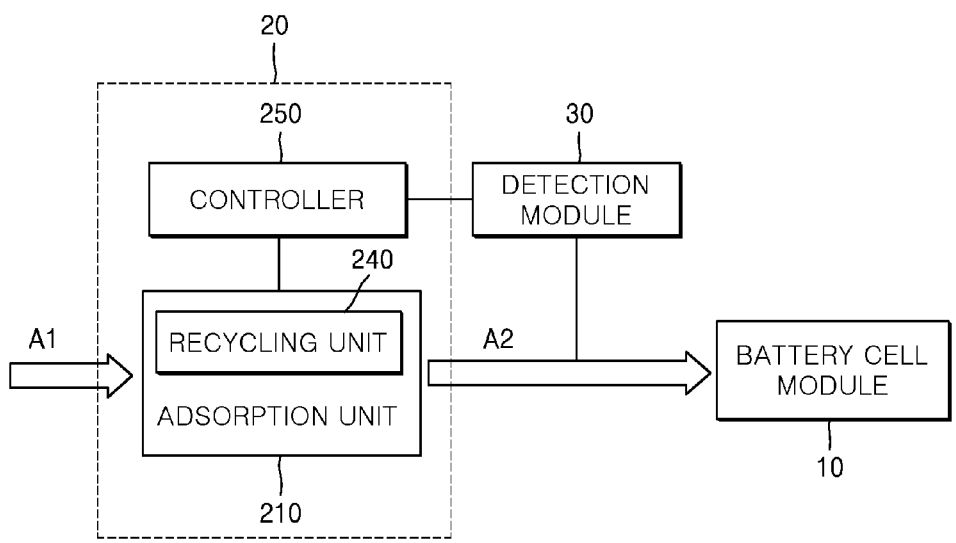
FIG. 2 is a view of the metal air battery illustrated in FIG. 1, showing further detail of the air purification module.

FIG. 1 is a schematic view of an embodiment of an electrochemical cell, and FIG. 2 is a view for explaining an example of an air purification module 20, which is illustrated in FIG. 1.

Referring to FIGS. 1 and 2, the electrochemical cell according to an exemplary embodiment may include a battery cell module 10 and an air purification module 20. The electrochemical cell may be a metal air battery. The metal air battery may be a lithium air battery.

The battery cell module 10 may generate electricity using a chemical reaction. For example, the battery cell module 10 generates electricity using oxidation of a metal and reduction of oxygen.

For example, when the metal is lithium (Li), the metal air battery generates electricity through a reaction in which Li and oxygen react with each other and lithium peroxide ($Li_2O_2$) is generated when the metal air battery is discharged, as shown in Reaction Formula 1.

$$Li + 1/2 O_2 \rightarrow 1/2 Li_2O_2 \qquad \text{Reaction formula 1}$$

However, when an impurity, for example water ($H_2O$), is present in the air supplied to the battery cell module, an energy density and a lifetime of the metal air battery are reduced due to a reaction which generates lithium hydroxide (LiOH), as shown in Reaction Formula 2.

$$4Li + 6H_2O + O_2 \rightarrow 4(LiOH \cdot H_2O) \qquad \text{Reaction formula 2}$$

The air purification module 20 is in fluid communication with the battery cell module 10. The air purification module 20 purifies air A1 by removing water in the air A1, which can be introduced from the outside, and supplies the purified air A2 to the battery cell module 10. To this end, the air purification module 20 includes an adsorption unit 210 that adsorbs water.

Impurities, such as water, can be retained by both adsorption and absorption processes. While not wanting to be bound by theory, it is understood that most adsorption units operate using adsorption, however it is further understood that absorption can be used. For clarity and simplicity, as used herein the term "adsorption" is to understood to include both adsorption and absorption processes.

However, the amount of water that may be adsorbed into the adsorption unit 210 may be limited. Thus, when the amount of water included in the air A1 is increased or a usage period of the adsorption unit 210 is increased, the adsorption unit 210 may be saturated and may not adsorb any more water. When the adsorption unit 120 is saturated, the adsorption unit 210 may not operate satisfactorily. Although the air A1 introduced from the outside passes through the adsorption unit 210, water included in the air A1 may not be removed and may be transferred to the battery cell module 10.

Disclosed is an air purification module 20 which includes a recycling unit 240 that recycles the adsorption unit 210 by desorbing water adsorbed into the adsorption unit 210.

When a temperature of the adsorption unit 210 is low, the adsorption unit 210 may adsorb water. When the temperature of the adsorption unit 210 is high, the adsorption unit 210 may desorb water. For example, the adsorption unit 210 may desorb water when the internal temperature of the adsorption unit 210 is about 50° C. to about 200° C.

The recycling unit 240 may be configured to heat the adsorption unit 210 so as to desorb water adsorbed into the adsorption unit 210. For example, the recycling unit 240 may be a heater that heats the adsorption unit 210. However, the configuration of the recycling unit 240 is not limited thereto, and the recycling unit 210 that may heat directly or indirectly the adsorption unit 210 may be modified in various ways. For example, the recycling unit 240 may also be a member that supplies the heated air to the adsorption unit 210.

In the foregoing embodiment, the recycling unit 240 is configured to heat the adsorption unit 210. However, the metal air battery is not limited thereto, and the recycling unit 240 can be configured to desorb water from the adsorption unit 210 in various ways. For example, the recycling unit 240 may be configured to reduce pressure at the periphery of the adsorption unit 210 or to supply a recycling fluid to the adsorption unit 210.

The metal air battery may include a detection module 30 that detects a concentration of water included in the purified air A2. The air purification module 20 may include a controller 250 that controls an operation of the recycling unit 240 based on the concentration of water detected by the detection module 30, or by determining a content of water accumulated in the adsorption unit 210, e.g., by integration of the concentration of water detected by the detection module 30 over time.

The controller 250 may thus determine whether the recycling unit 240 operates, e.g., by comparing the concentration of water detected by the detection module 30 with a predetermined reference concentration, or by comparing a content of water accumulated in the adsorption unit 210 with a reference content.

The amount of water included in atmospheric air may change according to a change in an external environment and thus the amount of water included in the air A1 introduced into the air purification module 20 may change. For example, as a place where the metal air battery is disposed is changed, the amount of water included in the atmospheric air may change. In another example, as a season changes, the amount of water included in the atmospheric air may change. In another example, as weather changes, the amount of water included in the atmospheric air may change. For example, when it does not rain, the amount of water in the atmospheric air can be relatively low, and when it rains, the amount of water in the atmospheric air can be relatively increased.

The metal air battery according to the current embodiment may detect the concentration of water included in the purified air A2 in real time or periodically using the detection module 30 and may optionally operate the recycling unit 240 based on the detection information. Thus, when the amount of water included in the purified air A2 is increased, the metal air battery may operate the recycling unit 240 so that performance of the adsorption unit may be maintained.

If the metal air battery does not include the detection module 30, performance of the adsorption unit 210 may not be prevented from being reduced due to an increase in water included in the air A1. Thus, if water included in the air A1 increases, an energy density and a lifetime of the metal air battery can be reduced.

However, according to an exemplary embodiment, the detection module 30 detects the concentration of water and the controller 250 controls an operation of the recycling unit 240 based on the concentration of water detected by the detection module 30, preventing reduction in the performance of the adsorption unit 210.

The detection module 30 may be disposed at a downstream side of the air purification module 20. For example, the detection module 30 may be disposed between the air purification module 20 and the battery cell module 10. The detection module 30 may detect the concentration of water included in the purified air A2 that passes through the air purification module 20. Thus, it may be accurately determined whether the adsorption unit 210 is saturated.

Figure 3A:
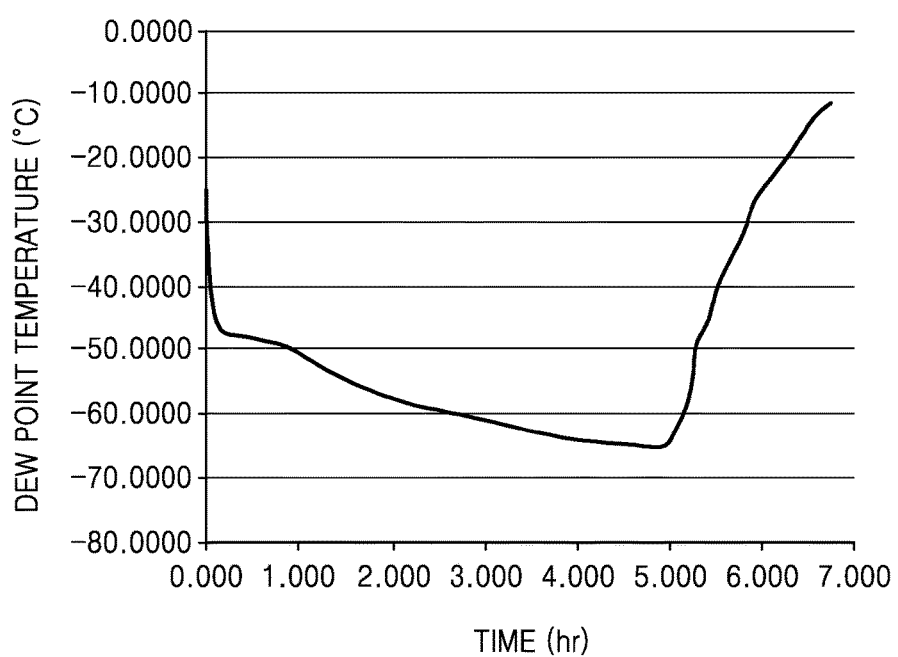
FIGS. 3A and 3B are each a graph of dew point temperature (° C.) versus time showing a dew point temperature of air that passes through the air purification module according to a Comparative Example.
Figure 3B:
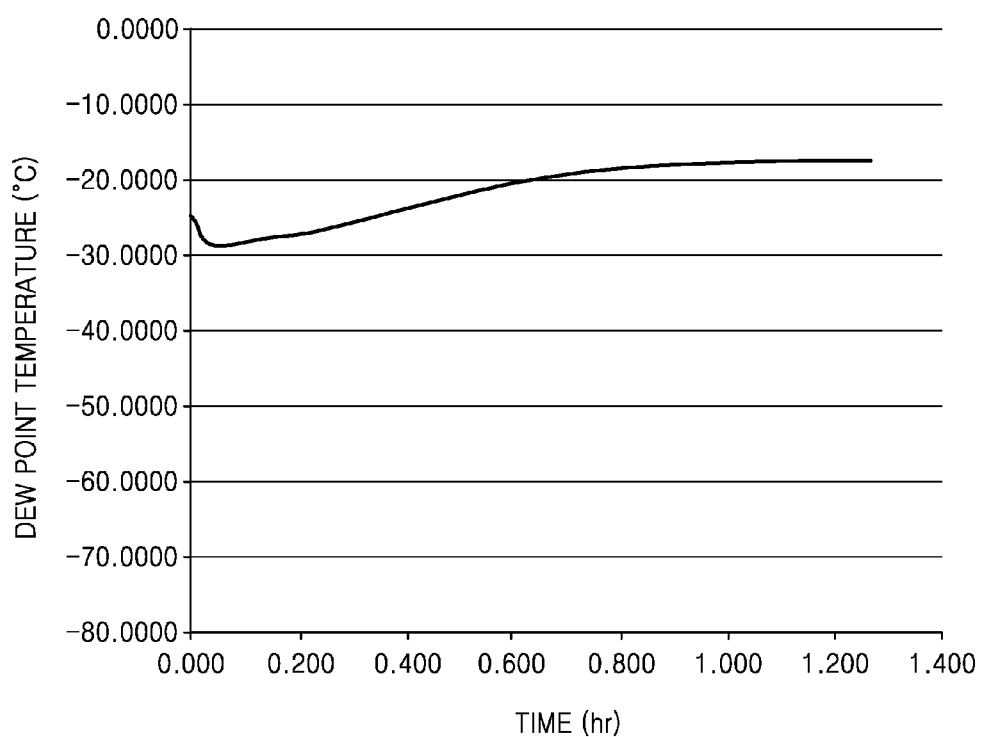
Figure 4:
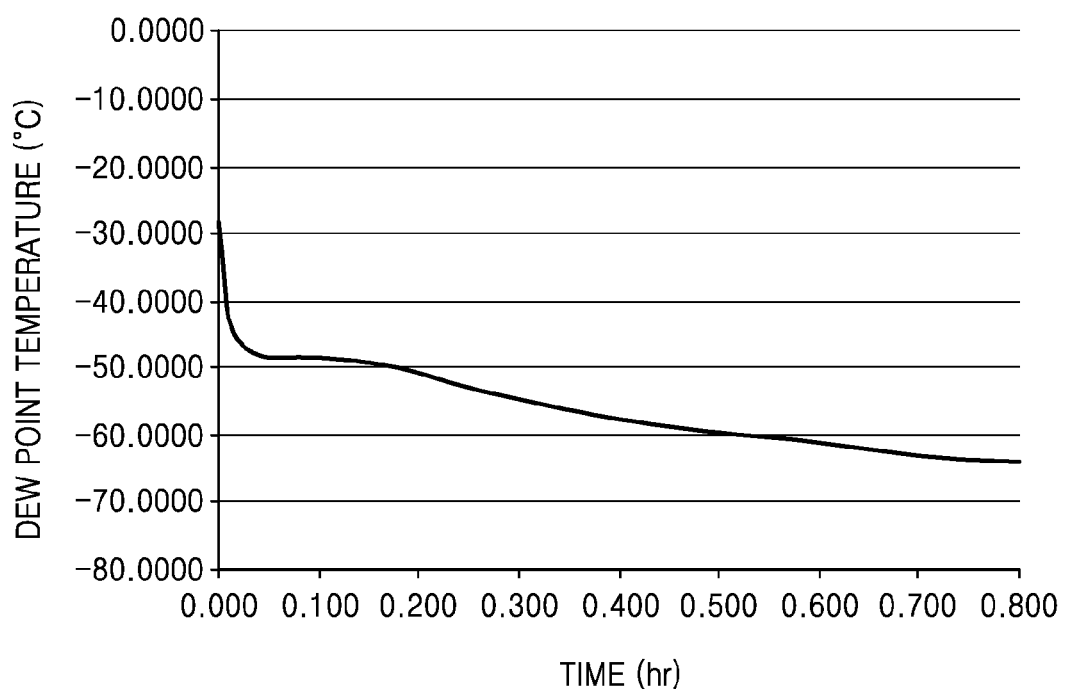
FIG. 4 is a graph of dew point temperature (° C.) versus time showing a dew point temperature of air that passes through an embodiment of an air purification module according to an Example.

FIGS. 3A and 3B are graphs showing a dew point temperature of the purified air A2 that passes through the air purification module according to a Comparative Example, and FIG. 4 is a graph showing a dew point temperature of the purified air A2 that passes through the air purification module 20 according to an Example.

FIG. 3A shows a change in a dew point temperature of the purified air A2 that passes through the air purification module 20 when the recycling unit 240 is not included in the air purification module 20. Referring to FIG. 3A, the dew point temperature of the purified air A2 that passes through the air purification module 20 is rapidly increased after five hours have elapsed. This may mean that, when five hours have elapsed after measurement, the adsorption unit 210 is saturated with water and cannot adsorb any more. Thus, even though the air A1 introduced from the outside passes through the adsorption unit 210, after five hours have elapsed, the water is not removed from the air and the air supplied to the battery cell module 10 is effectively unfiltered.

FIG. 3B shows a change in the dew point temperature of the purified air A2 that passes through the air purification module 20 when the metal air battery of FIG. 3A is turned off and then is turned on again. Referring to FIG. 3B, the purified air A2 that passes through the air purification module 20 does not have a dew point temperature that is equal to or less than −30° C. That is, since the adsorption unit 210 has been already saturated with water, even though the metal air battery is turned off and operates again, performance of the adsorption unit 210 is not improved.

FIG. 4 shows a change in the dew point temperature of the purified air A2 that passes through the air purification module 20 when the adsorption unit 210 saturated with water is heated by the recycling unit 240. Referring to FIG. 4, in the air purification module 20, the purified air A2 that passes through the air purification module 20 has a dew point temperature that is equal to or less than a predetermined temperature even thought a predetermined amount of time elapses. For example, the purified air A2 that passes through the air purification module 20 has a dew point temperature that is equal to or less than −40° C. for at least four hours. This is because water adsorbed into the adsorption unit 210 is separated by the recycling unit 240 and the adsorption unit 210 is recycled.

Thus, in the metal air battery according to the current embodiment, the recycling unit 240 may desorb water so that the performance of the metal air battery may be maintained for a longer time than in the case of an air purification module that does not include the recycling unit 240. For example, a lifetime of the metal air battery may be extended two times or more relative to a lifetime of a metal air battery that does not include the recycling unit 240.

Figure 5:
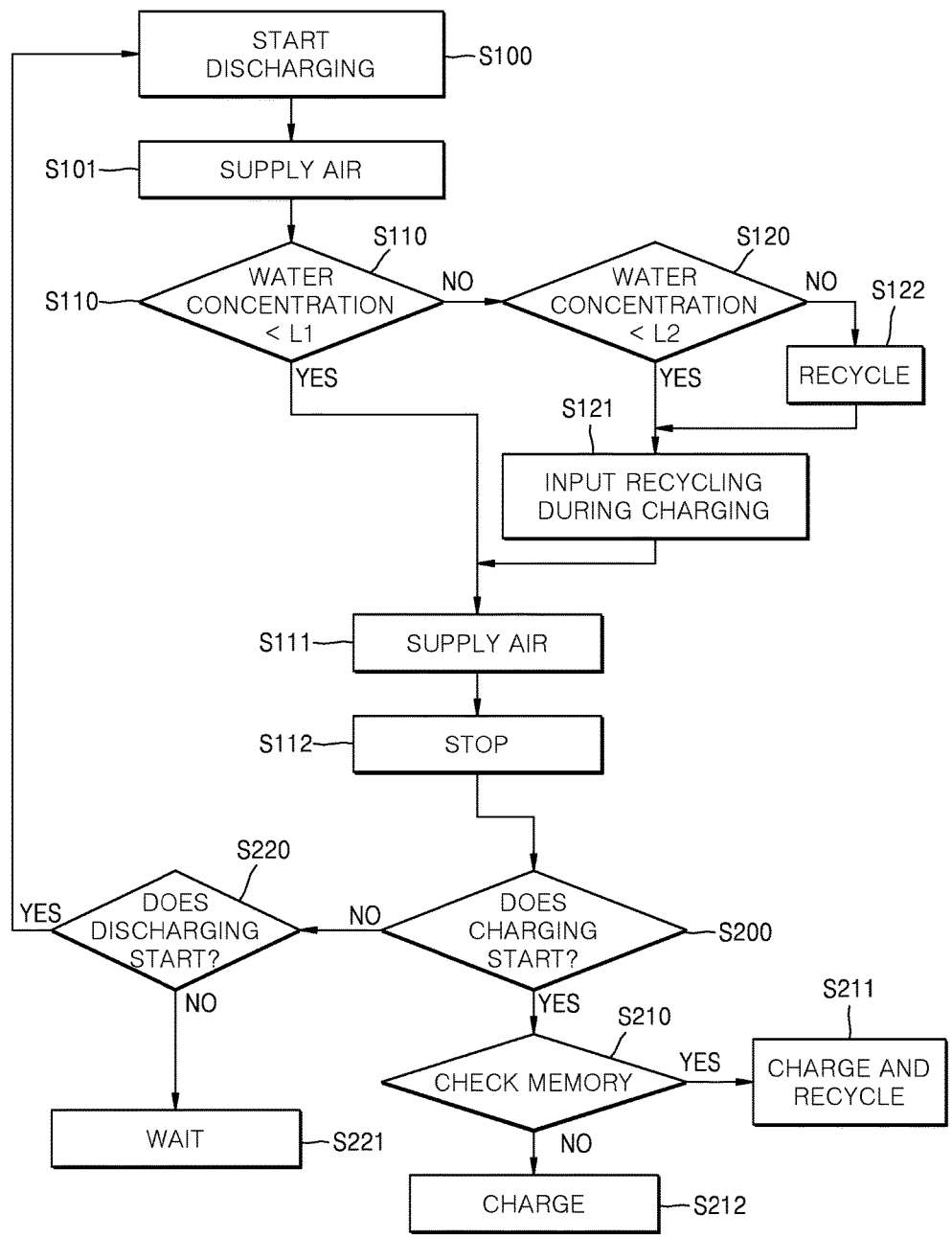
FIG. 5 is a flowchart of an embodiment of a method of operating a metal air battery.

FIG. 5 is a flowchart of a method of operating a metal air battery according to an exemplary embodiment.

Referring to FIG. 5, the metal air battery starts discharging (S100). While discharging of the metal air battery is performed, the air purification module 20 filters the air to remove an impurity, e.g., water, from the air A1 and supplies the purified air to the battery cell module 10 (S101).

The detection module 30 detects a concentration of water included in the air that passes through the air purification module 20. The controller 250 may determine whether to operate the recycling unit 240 or a time of operating the recycling unit 240 based on the concentration of water detected by the detection module 30, or based on content of water accumulated in the air purification module.

The controller 250 can compare the detected concentration of the impurity, e.g., water, with a first reference concentration L1 (S110). For example, it can be determined whether the detected concentration of water is less than the first reference concentration L1. Alternatively, the controller 250 can use the detected concentration of the impurity, e.g., water, to determine a content of accumulated impurity. For example, the controller can determine whether the detected content of accumulated water is less than a reference content, wherein the reference content may be selected based on a capacity of the adsorption unit, and may be, for example, 50% to 99%, 60% to 95%, or 70% to 90% of the capacity of the adsorption unit.

When the detected concentration of water is less than the first reference concentration L1, or the detected content of accumulated impurity is less than a reference content, the controller 250 does not operate the recycling unit 240. Thus, while discharging is performed, the metal air battery continuously supplies the air, from which an impurity such as water has been removed by the air purification module 20, to the battery cell module 10 (S111).

When the detected concentration of the impurity, e.g., water, is equal to or greater than the first reference concentration L1, or the detected content of accumulated impurity is greater than a reference content, it is determined whether the detected concentration of the impurity is less than a second reference concentration L2 that is greater than the first reference concentration L1 (S120), or if the detected content is less than a second reference content, wherein the second reference content is greater than the reference content.

When the detected concentration of the impurity is greater than the first reference concentration L1 and is less than the second reference concentration L2, instructions to recycle the adsorption unit 210 when charging is performed are input (S121). That is, when discharging is performed, the recycling unit 240 is not operated, and when charging is performed, the recycling unit 240 is operated, and the adsorption unit 210 is recycled.

When the detected concentration of the impurity is greater than the second reference concentration L2, or when the detected content of the impurity is greater than the second reference content, the controller 250 may operate the recycling unit 240 and may recycle the adsorption unit 210 even when the battery cell module 10 performs discharging (S122). Even when the detected concentration of water is equal to the second reference concentration L2, the controller 250 may operate the recycling unit 240 and may recycle the adsorption unit 210 while the battery cell module 10 performs discharging. While the battery cell module 10 performs discharging, a structure for operating the recycling unit 240 will be described with reference to FIGS. 7 through 10.

The controller 250 operates the recycling unit 240 until the detected concentration of water is less than the second reference concentration L2. When the detected concentration of water is less than the second reference concentration L2, instructions to recycle the adsorption unit 210 when charging is performed are input to memory (S121).

Subsequently, while discharging is performed, the controller 250 does not operate the recycling unit 240, and the purified air A2 purified by the air purification module 20 is supplied to the battery cell module 10 (S111). When discharging is stopped, the supply of air to the battery cell module 10 is stopped (S112).

Next, it is determined whether charging of the metal air battery starts (S200). When charging of the metal air battery starts, the controller 250 may check information stored in the memory (S210).

In case that the instructions to operate the recycling unit 240 when charging is performed are input to the memory, recycling of the adsorption unit 210 is performed by the recycling unit 240 together with charging of the metal air battery (S211). Thus, water adsorbed into the adsorption unit 210 may be desorbed and discharged to the outside. In case that the instructions to operate the recycling unit 240 when charging is performed are not input to the memory, charging is performed without recycling the adsorption unit 210 (S212).

When charging of the metal air battery is not performed, it is determined whether discharging starts (S220). When discharging of the metal air battery starts, the same procedure as the above-described procedure is performed. However, when charging and discharging of the metal air battery is not performed, the metal air battery may be waiting without being discharged or charged (S221).

Figure 6:
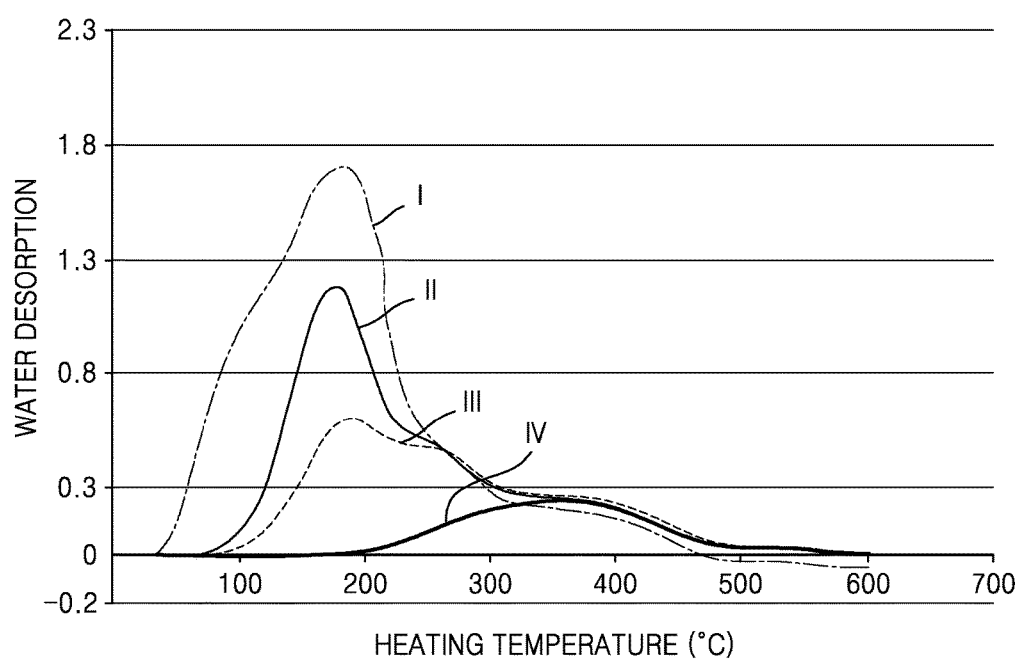
FIG. 6 is a graph of water desorption (intensity) from an adsorption unit versus heating temperature (° C.) showing a degree of water desorbed from an adsorption unit according to a heating time of the adsorption unit and a change in heating temperature.

FIG. 6 is a graph showing a degree of water desorbed from the adsorption unit 210 according to a heating time of the adsorption unit 210 and a change in heating temperature. To develop the results shown in FIG. 6, zeolite LiX is used as an adsorption material of the adsorption unit 210.

FIG. 6 shows the amount of water desorbed from the adsorption unit 210 according to the heating temperature in four cases, i.e., in case where the adsorption unit 210 is saturated with water (I), in case where the adsorption unit 210 saturated with water is heated at 100° C. for one hour (II), in case where the adsorption unit 210 saturated with water is heated at 100° C. for two hours (III), and in case where the adsorption unit 210 saturated with water is heated at 200° C. for one hour, respectively.

In the case I, as the heating temperature of the adsorption unit 210 rises, the amount of water desorbed from the adsorption unit 210 increases and then decreases. For example, the amount of desorbed water is increased in a heating section up to about 180° C., for example, and the amount of desorbed water is decreased in a heating section that exceeds 180° C.

In the case II, as the heating temperature of the adsorption unit 210 rises, the amount of water desorbed from the adsorption unit 210 increases and then decreases. For example, the amount of desorbed water is increased in a heating section from about 100° C. to about 180° C., and the amount of desorbed water is decreased in the heating section that exceeds about 180° C.

In the case III, as the heating temperature of the adsorption unit 210 rises, the amount of water desorbed from the adsorption unit 210 increases and then decreases. For example, the amount of desorbed water is increased in the heating section from about 100° C. to about 180° C., and the amount of desorbed water is decreased in the heating section that exceeds about 180° C.

In the case IV, as the heating temperature of the adsorption unit 210 is increased, the amount of water desorbed from the adsorption unit 210 increases and then decreases. For example, the amount of desorbed water is increased in a heating section from about 200° C. to about 350° C., and the amount of desorbed water is decreased in a heating section that exceeds about 350° C.

Figure 7:
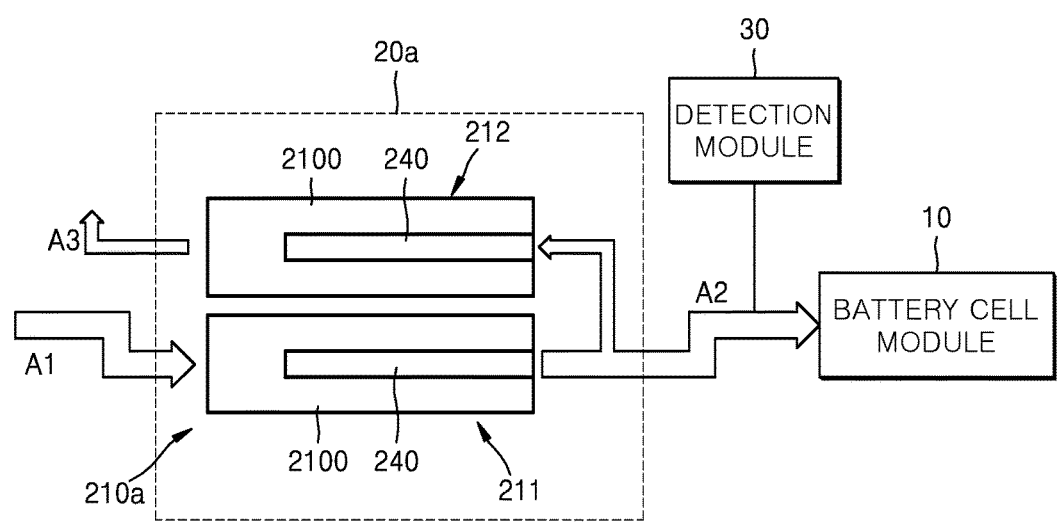
FIG. 7 is a schematic view of an embodiment of an air purification module.

FIG. 7 is a schematic view of an air purification module 20a according to an exemplary embodiment. In FIG. 7, for convenience and clarity, illustration of the controller 250 is omitted. Referring to FIG. 7, an adsorption unit 210a includes a plurality of adsorption chambers arranged in parallel. For example, the adsorption unit 210a includes a first adsorption chamber 211 and a second adsorption chamber 212.

An adsorption material 2100 and a recycling unit 240 are disposed in the first adsorption chamber 211 and the second adsorption chamber 212, respectively.

The adsorption material 2100 may adsorb water from air A1. For example, the adsorption material 2100 may be zeolite, alumina, silica gel, metal-organic framework ("MOF"), zeolitic imidazolate framework ("ZIF"), activated carbon or a mixture thereof. The MOF is a crystalline compound that includes metallic ions or a metal cluster disposed in an organic molecule and which forms a porous primary, secondary or tertiary structure. In addition, the ZIF is a nano-porous compound including a tetrahedral cluster of $MN_4$ (wherein M is a metal) linked by an imidazolate ligand.

The adsorption unit 210a alternately adsorbs water through the first adsorption chamber 211 and the second adsorption chamber 212 and supplies purified air A2 to the battery cell module 10. For example, the adsorption unit 210a may be configured to be operated by pressure swing adsorption ("PSA"). When PSA is used, the adsorption unit 210a increases and/or decreases a pressure of the first and second adsorption chambers 211 and 212, thereby adsorbing or desorbing water in the air using the adsorption unit 210a. For example, the adsorption unit 210a may adsorb water by increasing an internal pressure of the first adsorption chamber 211 and may supply the purified air A2 to the battery cell module 10, and may desorb water adsorbed into the adsorption material 2100 by reducing an internal pressure of the second adsorption chamber 212 and may discharge air A3 to the outside.

However, an operation technique of the adsorption unit 210a is not limited to PSA. For example, the adsorption unit 210a may be configured to operate by temperature swing adsorption ("TSA"), pressure temperature swing adsorption ("PTSA"), vacuum swing adsorption ("VSA") or a combination thereof. In the present specification, PSA refers to a technique in which a particular gas is primarily adsorbed or captured by the adsorption material 2100 at a high partial pressure, and when the partial pressure is reduced, the particular gas is desorbed or discharged, TSA refers to a technique in which a particular gas is primarily adsorbed or captured by the adsorption material 2100 at a room temperature, and when temperature rises, the particular gas is desorbed or discharged, PTSA refers to a technique in which PSA and TSA are combined, and VSA refers to a technique in which a particular gas is primarily adsorbed or captured by the adsorption material 2100 in the vicinity of atmospheric pressure and the particular gas is desorbed or discharged under vacuum.

The recycling unit 240 may be a heater that heats the adsorption material 2100. The recycling unit 240 may contact and heat the adsorption material 2100. However, embodiments are not limited thereto. For example, the recycling unit 240 may also heat the adsorption material 2100 by convection or radiation even though the recycling unit 240 is spaced apart from the adsorption material 2100. Further details of the construction of the air purification module 20a can be determined by one of skill in the art without undue experimentation, and are not included here for clarity.

When the concentration of water detected by the detection module 30 is out of a reference range, the recycling unit 240 may operate to recycle the adsorption unit 210a. For example, when the concentration of water detected by the detection module 30 is equal to or exceeds the first reference concentration L1, the recycling unit 240 may operate.

The time of operating the recycling unit 240 may be determined by comparing the detected concentration of water with the second reference concentration L2. For example, when the detected concentration of water is out of the second reference concentration L2, even when discharging of the metal air battery is performed, the recycling unit 240 may operate. However, when the detected concentration of water is not out of the second reference concentration L2, when discharging of the metal air battery is performed, the recycling unit 240 does not operate, and when charging of the metal air battery is performed, the recycling unit 240 may operate.

When discharging of the metal air battery is performed, the first and second adsorption chambers 211 and 212 alternately supply the purified air to the battery cell module 10. One of the first and second adsorption chambers 211 and 212 supplies the purified air to the battery cell module 10, and the other one of the first and second adsorption chambers 211 and 212 operates the recycling unit 240 to recycle the adsorption material 2100. For example, the first adsorption chamber 211 does not operate the recycling unit 240 and supplies the purified air A2 to the battery cell module 10, and the second adsorption chamber 212 operates the recycling unit 240 to recycle the adsorption material 2100. Thus, although discharging of the metal air battery is performed, water of a part of the adsorption unit 210a may be desorbed by the recycling unit 240.

Figure 8:
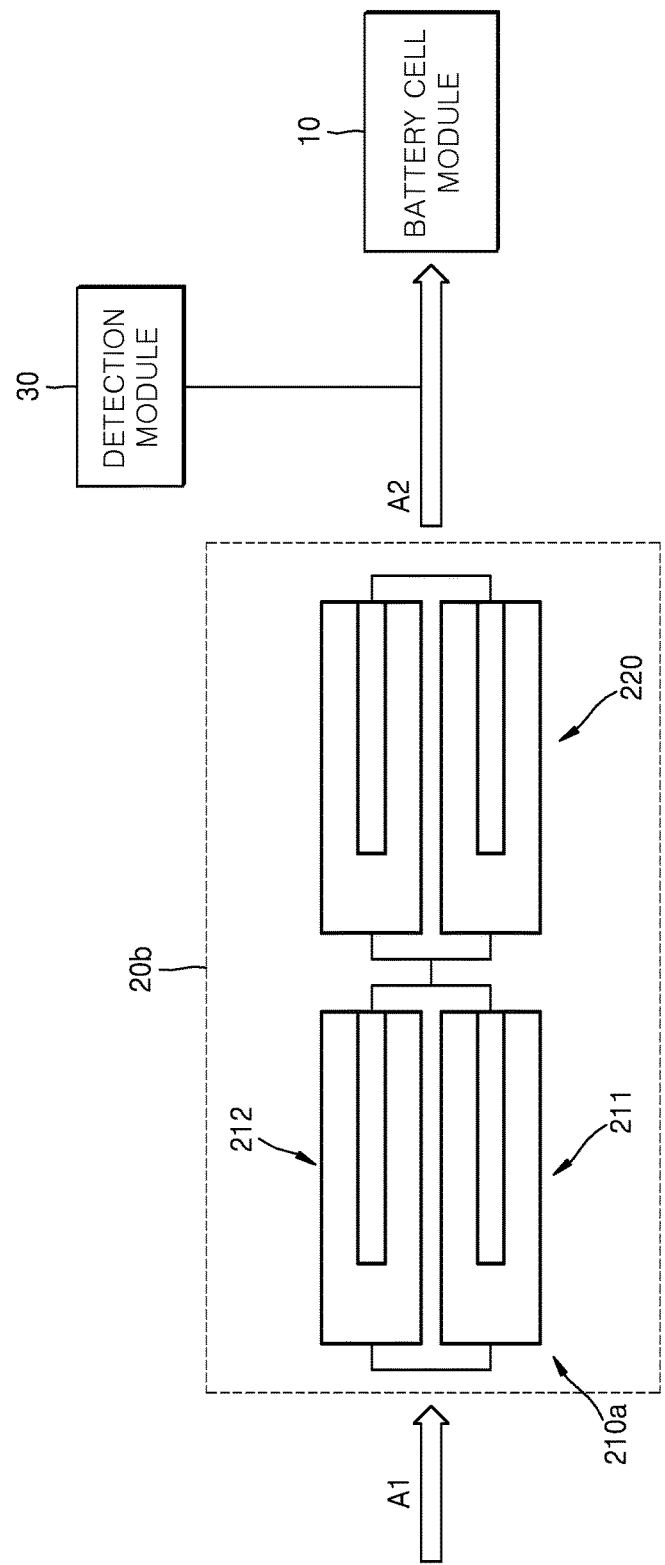
FIG. 8 is a schematic view of an embodiment of an air purification module.

FIG. 8 is a schematic view of an air purification module 20b according to another exemplary embodiment. Referring to FIG. 8, the air purification module 20b may further include a second adsorption unit 220. The adsorption unit 210a is the same as that of the above-described embodiment and thus, a redundant description thereof will be omitted.

The second adsorption unit 220 may be disposed in series with the adsorption unit 210a. For example, the second adsorption unit 220 may be disposed between the adsorption unit 210a and the battery cell module 10. The second adsorption unit 220 purifies the air that passes through the adsorption unit 210a and supplies the purified air to the battery cell module 10.

The second adsorption unit 220 may adsorb an impurity different from that adsorbed by the adsorption unit 210a. For example, the second adsorption unit 220 may adsorb nitrogen to enhance the concentration of oxygen.

The second adsorption unit 220 may further adsorb water in addition to nitrogen. For example, the second adsorption unit 220 may adsorb at least a part of water from the air. Thus, although the adsorption unit 210a is saturated with water, water may be temporarily adsorbed into the second adsorption unit 220.

Thus, although, while or before the recycling unit 240 included in the adsorption unit 210a operates, water in the air A1 is not adsorbed but passes through the adsorption unit 210a, and water may be adsorbed into the second adsorption unit 220. Thus, even when the metal air battery is being discharged, desorption of water from the adsorption unit 210a may be performed by the recycling unit 240 disposed in the adsorption unit 210a.

Figure 9:
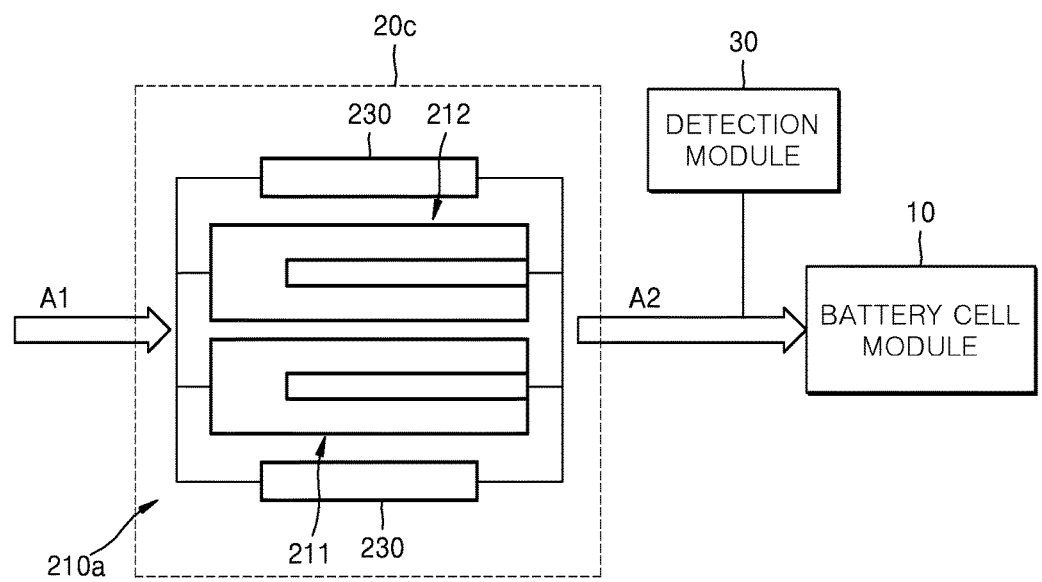
FIG. 9 is a schematic view of an embodiment of an air purification module.

FIG. 9 is a schematic view of an air purification module 20c according to another exemplary embodiment. Referring to FIG. 9, the air purification module 20c may further include an auxiliary adsorption unit 230. The adsorption unit 210a is the same as that of the above-described embodiment and thus, a redundant description thereof will be omitted.

The auxiliary adsorption unit 230 may be disposed in parallel to the adsorption unit 210a.

The auxiliary adsorption unit 230 may have a smaller volume than that of the adsorption unit 210a. The auxiliary adsorption unit 230 may have a smaller adsorption capacity than that of the adsorption unit 210a. Thus, a volume of the auxiliary adsorption unit 230 in the air purification module 20c may be reduced.

The auxiliary adsorption unit 230 may be temporarily used to adsorb water while the adsorption unit 210a is recycled by the recycling unit 240.

The air purification module 20c further includes the auxiliary adsorption unit 230 so that, even when the metal air battery is being discharged, desorption of water from the adsorption unit 210a may be smoothly performed by the recycling unit 240.

In the above-described embodiments, an example in which a detection module 30 is disposed at a downstream side of the air purification module 20, 20a, 20b, and 20c. However, arrangement of the detection module 30 is not limited thereto and may be changed.

Figure 10:
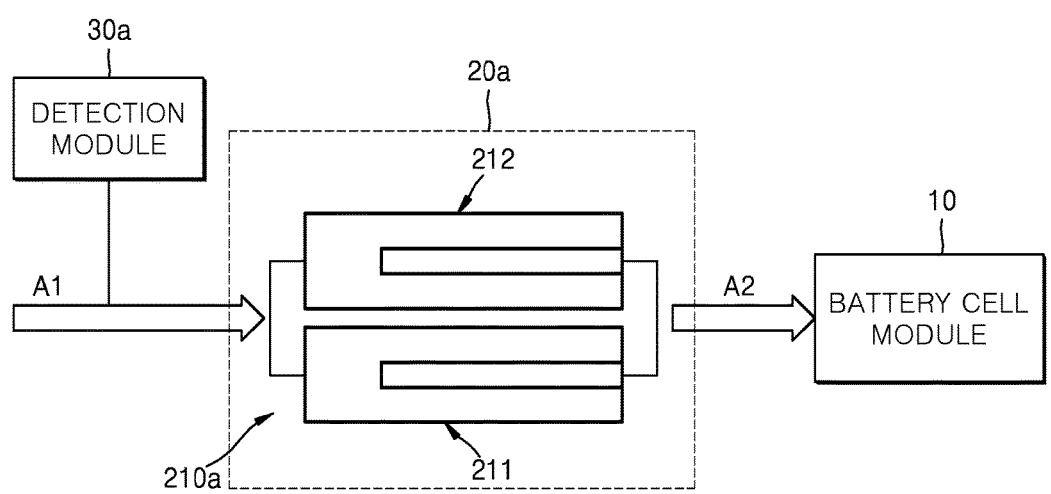
FIG. 10 is a view for explaining an example in which arrangement of detection modules is changed.

For example, the detection module 30a may be disposed at an upstream side of an air purification module 20a, as illustrated in FIG. 10. The detection module 30a may detect a concentration of water included in air A1 introduced into the air purification module 20a. In this case, mapping information regarding the concentration of water included in the introduced air A1 and a concentration of water included in the purified air A2 may be previously input to the controller 250. Thus, the controller 250 may calculate the concentration of water included in the air A2 that passes through the air purification module 20a based on the information detected by the detection module 30a. Thus, the controller 250 may control an operation of the recycling unit 240 in the same manner as that of the above-described embodiment.

Hereinafter, a configuration of the battery cell module 10 included in the metal air battery will be described with reference to FIG. 11.

Figure 11:
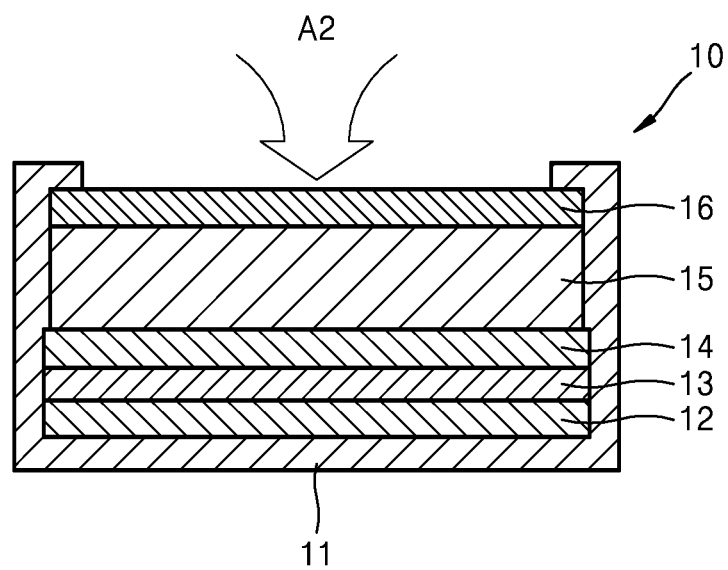
FIG. 11 is a cross-sectional view schematically illustrating an example of an embodiment of a cell, which can be included in a metal air battery.

Referring to FIG. 11, the battery cell module 10 includes a housing 11, a cathode metal layer 12, a cathode electrolyte layer 13 disposed on the cathode metal layer 12, an oxygen blocking layer 14 disposed on the cathode electrolyte layer 13, an anode layer 15 disposed on the oxygen blocking layer 14, and a gas diffusion layer 16 disposed on the anode layer 15.

The housing 11 may accommodate the cathode metal layer 12, the cathode electrolyte layer 13, the oxygen blocking layer 14, the anode layer 15, and the gas diffusion layer 16 and may seal them.

The cathode metal layer 12 performs a function of absorbing and discharging metallic ions. The cathode metal layer 12 may include, for example, lithium (Li), sodium (Na), zinc (Zn), potassium (K), calcium (Ca), magnesium (Mg), iron (Fe), aluminum (Al) or an alloy of two or more thereof.

The cathode electrolyte layer 13 performs a function of transferring the metallic ions to the anode layer 15 through the oxygen blocking layer 14. To this end, the cathode electrolyte layer 13 may include an electrolyte.

In one example, the electrolyte may be a solid phase including a polymeric electrolyte, an inorganic electrolyte, or a composite electrolyte that is a mixture thereof and may be manufactured to be bendable.

In another example, the electrolyte may be formed by dissolving a salt in a solvent.

The salt may be a lithium salt, such as $LiN(SO_2CF_2CF_3)_2$, $LiN(SO_2C_2F_5)_2$, $LiClO_4$, $LiBF_4$, $LiPF_6$, $LiSbF_6$, $LiAsF_6$, $LiCF_3SO_3$, $LiN(SO_2CF_3)_2$, $LiC(SO_2CF_3)_3$, $LiN(SO_3CF_3)_2$, $LiC_4F_9SO_3$, $LiAlCl_4$ or lithium bis(trifluoromethanesulfonyl)imide (LiTFSl). Examples of the lithium salt may further include $AlCl_3$, $MgCl_2$, $NaCl$, $KCl$, $NaBr$, $KBr$, and $CaCl_2$.

Any suitable solvent may be used without limitation. For example, the solvent may include a carbonate-based solvent, such as dimethylcarbonate (DMC), an ester-based solvent, such as methyl acetate, an ether-based solvent, such as dibutyl ether, a ketone-based solvent, such as cyclohexanone, an amine-based solvent, such as triethylamine, a phosphine-based solvent, such as triethylphosphine, or a mixture thereof.

The oxygen blocking layer 14 may prevent transmission of oxygen and may be conductive with respect to the metallic ions. The oxygen blocking layer 14 may include a bendable high molecular material. For example, the oxygen blocking layer 14 may be a porous film formed of an olefin-based resin, such as high molecular non-woven fabric polyethylene, such as a non-woven fabric formed of polypropylene or a non-woven fabric formed of polyphenylene sulfide or polypropylene, or a porous separation layer including a combination thereof.

The oxygen blocking layer 14 and the cathode electrolyte layer 13 may be formed as separate layers. In other embodiment, the oxygen blocking layer 14 and the cathode electrolyte layer 13 may be formed as a single layer by immersing an electrolyte into pores of the porous separation layer having an oxygen blocking function. For example, the electrolyte formed by mixing polyethylene oxide (PEO) and LiTFSl may be immersed into the pores of the porous separation layer so that the cathode electrolyte layer 13 and the oxygen blocking layer 14 may be integrated with each other.

The anode layer 15 may include an electrolyte for conduction of the metal ions, a catalyst for oxidation and reduction of oxygen, a conductive material, and a binder. For example, after the above-described electrolyte, catalyst, conductive material and binder are mixed with each other, the solvent is added to the mixture so that an anode slurry may be manufactured. The anode slurry may be applied onto the oxygen blocking layer 14 and then may be dried so that the anode layer 15 may be formed. The solvent may be the same as a solvent used to manufacture the electrolyte included in the cathode electrolyte layer 13.

The electrolyte included in the anode layer 15 may include a lithium salt included in the cathode electrolyte layer 13 and optionally an additional salt.

The catalyst may include an oxide of a metal selected from platinum (Pt), gold (Au), silver (Ag), manganese (Mn), nickel (Ni), cobalt (Co), an alloy thereof or a combination thereof.

The conductive material may include a carbon-based material having porosity, such as carbon black, graphite, graphene, activated carbon, carbon fiber or carbon nanotubes (CNTs), a conductive metallic material having a metal powder shape, such as Cu powder, Ag powder, Ni powder or Al powder, a conductive organic material, such as a polyphenylene derivative, or a mixture thereof.

The binder may include polytetrafluoroethylene (PTFE), polypropylene, polyvinylidene fluoride (PVDF), polyethylene, styrene-butadien rubber or a mixture thereof.

The gas diffusion layer 16 performs a function of equally supplying the purified air A2 to the anode layer 15.

The gas diffusion layer 16 may include a metal having a porous structure, ceramics, polymer, a carbon material or a mixture thereof. The gas diffusion layer 16 has the porous structure, thereby adsorbing the purified air A2 discharged from the air purification module 20 and smoothly diffusing the adsorbed air.

As the metal having the porous structure, there may be used a foaming metal having a sponge shape or a metal fiber mat.

As the porous ceramic, a magnesium-aluminum silicate may be used.

As the porous polymer, a porous polyethylene or porous polypropylene may be used.

As the porous carbon material, a carbon paper comprising a carbon fiber, a carbon cloth, or a carbon felt may be used.

The structure of the battery cell module 10 included in the metal air battery according to an exemplary embodiment is not limited to the above-described structure, and the battery cell module 10 may have various structures.

The metal air battery according to an exemplary embodiment detects a concentration of water included in air and recycles an air purification module that purifies air supplied to a battery cell module based on the detected concentration of water so that a side reaction involving water may be prevented from occurring. Thus, energy efficiency and a lifetime of the metal air battery may be improved.

The metal air battery may be a metal primary battery or a metal secondary battery. In addition, the shape of the metal air battery is not specifically limited and may be a coin shape, a button shape, a sheet shape, a stack shape, a cylindrical shape, a flat shape or a horn shape. In addition, the metal air battery may be applied to a large battery used in an electric vehicle.

Meanwhile, in the above-described embodiments, a metal air battery has been described as an example of an electrochemical cell. However, the electrochemical cell is not limited thereto. For example, the electrochemical cell may also be another type of a cell that generates electrical energy using a chemical reaction, for example, a fuel cell. Here, the chemical reaction of the electrochemical cell may occur as air purified by an air purification module is supplied to an anode layer.

The term "air" used herein is not limited to atmospheric air and may include a combination of gases including oxygen or a pure oxygen gas.

Additional details of the air purification module, the detection module, and the battery cell module can be determined by one of skill in the art without undue experimentation. For example, the detection module may be a commercially available hydrometer. Accordingly, further detail has not been included herein for clarity.

It should be understood that exemplary embodiments described herein should be considered in a descriptive sense only and not for purposes of limitation. Descriptions of features, advantages, or aspects within each exemplary embodiment should typically be considered as available for other similar features, advantages, or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A metal air battery comprising:
   a battery cell module configured to generate electricity based on oxidation of a metal and reduction of oxygen;
   an air purification module comprising a first adsorption unit and being configured to supply air purified by the first adsorption unit to the battery cell module, the first adsorption unit being configured to adsorb an impurity, wherein the impurity comprises water; and
   a detection module configured to detect a concentration of the water in the purified air,
   wherein the air purification module further comprises a recycling unit configured to desorb the water adsorbed into the first adsorption unit; and
   a controller configured to control an operation of the recycling unit based on the concentration of the water detected by the detection module.

2. The metal air battery of claim 1, wherein the controller is further configured to operate the recycling unit when charging of the battery cell module is performed, by comparing a concentration of water detected by the detection module with a first reference concentration.

3. The metal air battery of claim 2, wherein the controller is further configured to operate the recycling unit when discharging of the battery cell module is performed, by comparing the concentration of water detected by the detection module with a second reference concentration which is greater than the first reference concentration.

4. The metal air battery of claim 3, wherein
   the first adsorption unit comprises a plurality of adsorption chambers disposed in parallel, and
   when discharging of the battery cell module is performed,
      a first adsorption chamber of the plurality of adsorption chambers adsorbs water and supplies purified air to the battery cell module, and
      a second adsorption chamber of the plurality of adsorption chambers desorbs water via the recycling unit and discharges water to an outside of the metal air battery.

5. The metal air battery of claim 1,
   wherein the controller is further configured to operate the recycling unit when charging of the battery cell module is performed, by comparing a content of water accumulated in the air purification module to a first reference content,
   wherein the content of water accumulated in the air purification module is determined from a concentration of water detected by the detection module, and
   wherein the first reference content is 50% to 99% of a total capacity of the air purification module.

6. The metal air battery of claim 1, wherein the recycling unit is further configured to heat the first adsorption unit.

7. The metal air battery of claim 1, wherein the air purification module further comprises a second adsorption unit in series with the first adsorption unit, the second adsorption unit being configured to purify air that passes through the first adsorption unit and supply the purified air to the battery cell module.

8. The metal air battery of claim 1, wherein the air purification module further comprises an auxiliary adsorption unit in parallel to the first adsorption unit and having an adsorption capacity less than that of the first adsorption unit.

9. The metal air battery of claim 1, wherein the detection module is placed in at least one position of an upstream and a downstream of the air purification module.

10. The metal air battery of claim 1, wherein the first adsorption unit is further configured to operate by at least one method selected from pressure swing adsorption, temperature swing adsorption, pressure temperature swing adsorption, and vacuum swing adsorption.

11. The metal air battery of claim 1, wherein the metal of the battery cell module is lithium.

12. A method of operating the metal air battery of claim 1, the method comprising:
   operating the battery cell module by charging or discharging the battery cell module;
   detecting a concentration of water in air; and
   desorbing and recycling the water adsorbed into the first adsorption unit with the recycling unit, based on the detected concentration of the water detected by the detection module in the air, to operate the metal air battery.

13. The method of claim 12, wherein the recycling unit is operated when charging of the battery cell module is performed, by comparing a concentration of water detected by the detection module with a first reference concentration.

14. The method of claim 12, wherein the recycling unit is operated when discharging of the battery cell module is performed, by comparing the concentration of water detected by the detection module with a second reference concentration which is greater than the first reference concentration.

15. The method of claim 14, wherein the first adsorption unit comprises a plurality of adsorption chambers in parallel, and when discharging of the battery cell module is performed, a first adsorption chamber of the plurality of adsorption chambers adsorbs water and supplies purified air to the battery cell module, and a second adsorption chamber of the plurality of adsorption chambers desorbs water via the recycling unit and discharges water to the outside.

16. The method of claim 13, wherein the recycling comprises heating the first adsorption unit to desorb water adsorbed into the first adsorption unit.

17. A method of operating a metal air battery, the method comprising:
purifying air with an air purification module of the metal air battery to provide purified air, wherein the air purification module comprises an adsorption unit configured to adsorb water from the air, a recycling unit, and a controller;
detecting a concentration of water in the purified air with a detection module of the metal air battery;
comparing the concentration of water in the purified air to a reference concentration using the controller;
saving an instruction to operate the recycling unit of the metal air battery, which recycles an adsorption unit of the air purification module when the concentration of water in the purified air is greater than a reference concentration; and
supplying the purified air to a battery cell to operate the metal air battery.

18. The method of claim 17, further comprising determining if the instruction to operate a recycling unit is present, and
operating the recycling unit to recycle the air purification module when the instruction to operate a recycling unit is present.

19. An electrochemical cell comprising:
a battery cell module configured to generate electricity using a chemical reaction;
an air purification module comprising an adsorption unit and being configured to supply air purified by the adsorption unit to the battery cell module, the adsorption unit configured to adsorb an impurity, wherein the impurity comprises water; and
a detection module configured to detect concentration of the water in the purified air,
wherein the air purification module further comprises:
a recycling unit configured to desorb the impurity adsorbed into the adsorption unit; and
a controller configured to control an operation of the recycling unit based on the concentration of the impurity detected by the detection module.

20. The electrochemical cell of claim 19, wherein
the controller is further configured to operate the recycling unit when charging of the battery cell module is performed, by comparing a concentration of water detected by the detection module with a first reference concentration and to operate the recycling unit when discharging of the battery cell module is performed, by comparing the concentration of water detected by the detection module with a second reference concentration which is greater than the first reference concentration.

* * * * *